Oct. 6, 1936.          V. H. HARBERT          2,056,270
HATCH COVER CONTROLLING AND SEALING DEVICE
Filed May 25, 1935          2 Sheets-Sheet 2
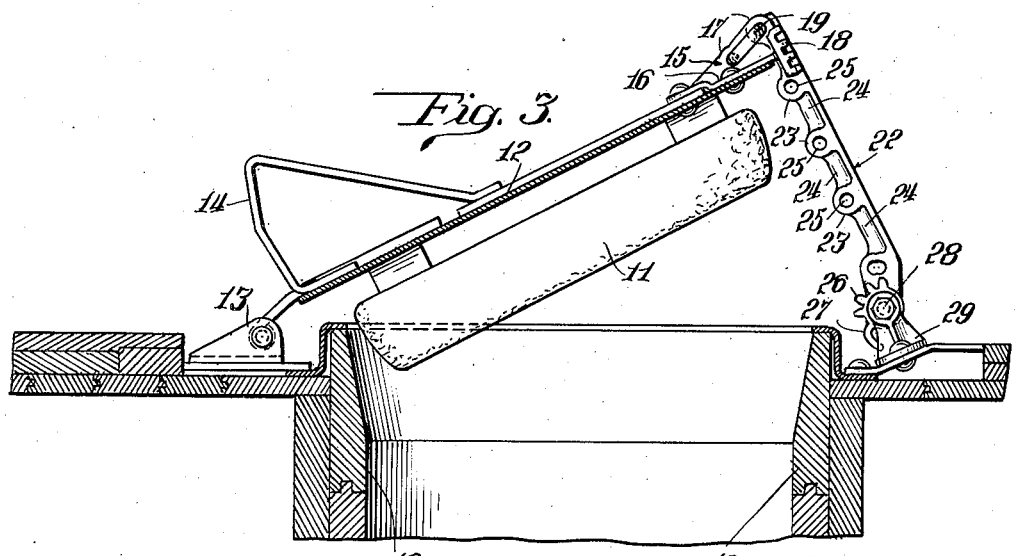
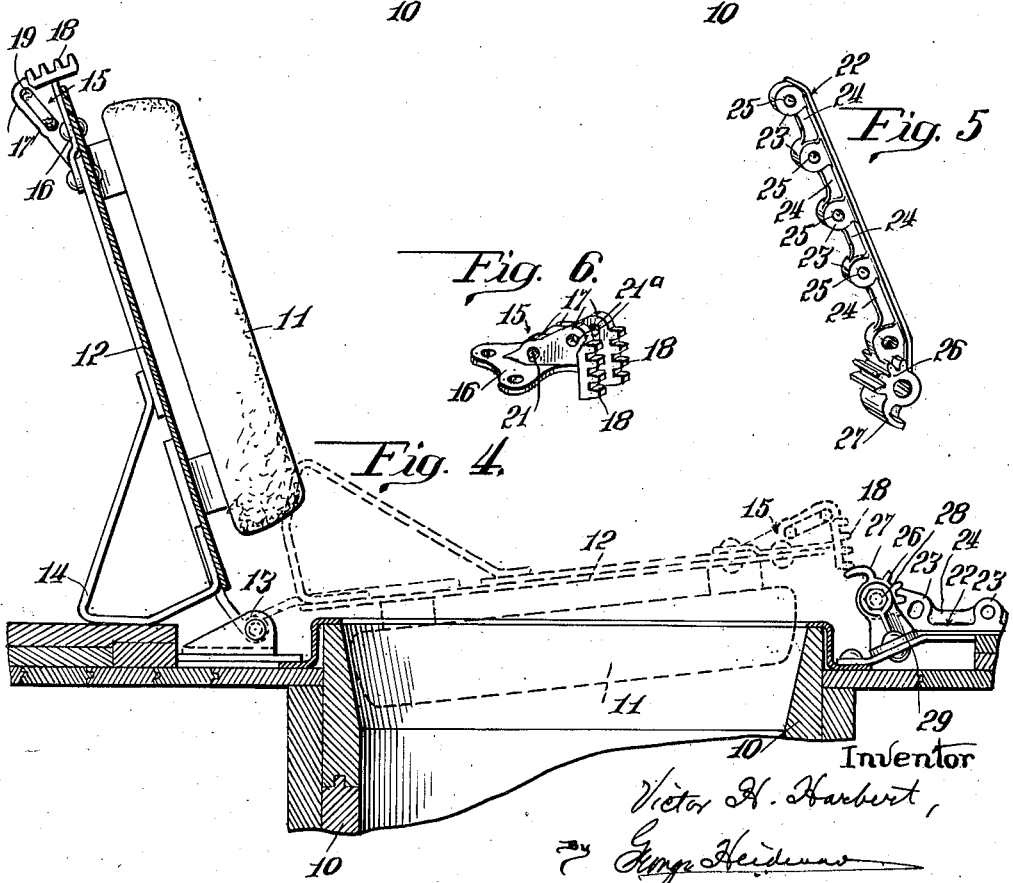

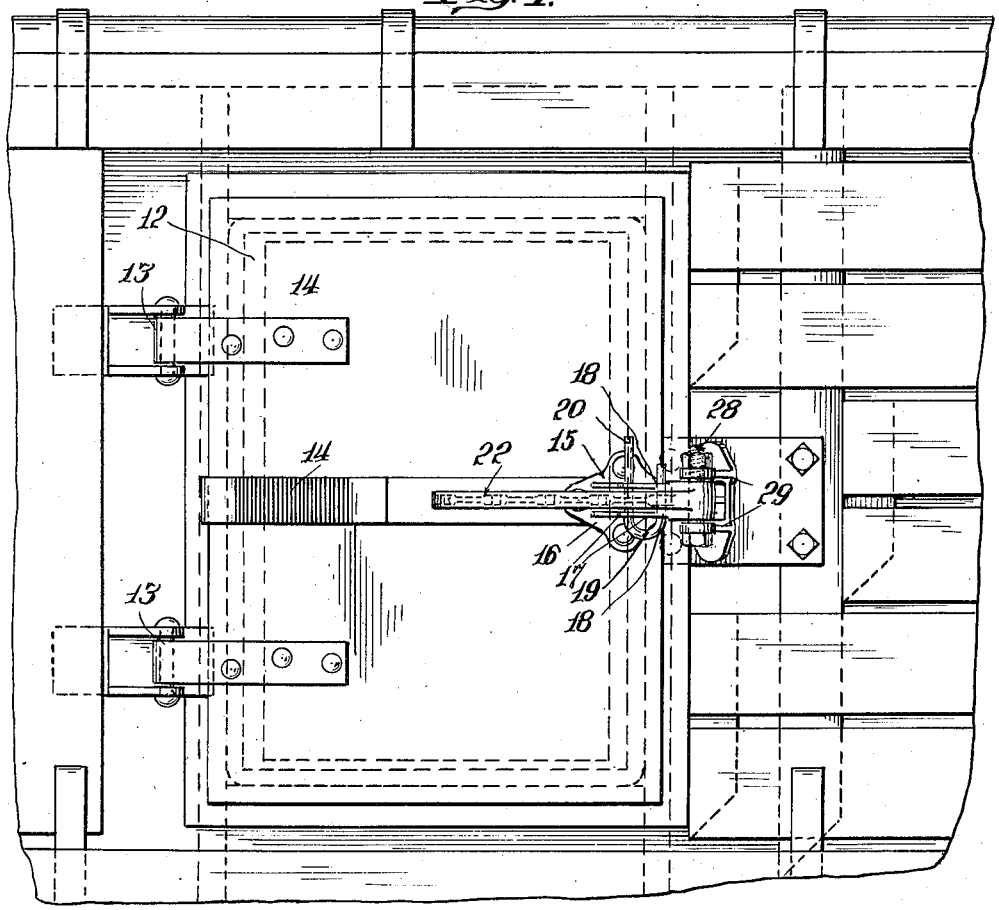
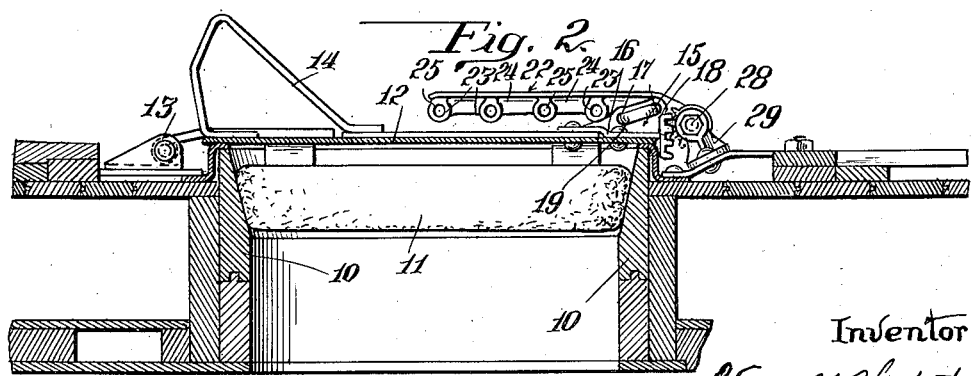

Patented Oct. 6, 1936

2,056,270

UNITED STATES PATENT OFFICE 2,056,270

HATCH COVER CONTROLLING AND SEALING DEVICE

Victor H. Harbert, Chicago, Ill., assignor to Illinois Railway Equipment Company, Chicago, Ill., a corporation of Illinois Application May 25, 1935, Serial No. 23,381

4 Claims. (Cl. 98—7)

My invention relates to a device especially intended for use in connection with the hatch cover and plug of refrigerator cars and has for its object the provision of a construction whereby the cover with its attached plug will be forced into completely closed position when the device is moved into sealing position; the device also involving means whereby the cover may be held in a number of ventilating positions and whereby the cover and said device may be sealed in closed position.

The invention also has for an object the provision of a structure whereby movement of the device will automatically force the hatch cover upwardly and thereby move the plug out of its wedged position in the hatch; while at the same time movement of the hatch cover and plug to closed position without also bringing said device into operative relation with the hatch cover is impossible.

The objects enumerated as well as other objects and advantages will be more fully comprehended from the following detailed description of the accompanying drawings, wherein:—

Figure 1 is a plan view of a hatch cover in closed position and provided with my improved device.

Figure 2 is a sectional elevation of the hatch with the cover and plug in closed position and with my controlling device in elevation and in cover locking position.

Figure 3 is a sectional elevation illustrating the cover partly open and my device holding the cover in ventilating position.

Figure 4 is a similar view showing the cover in complete open position and my improved controlling device in extreme dissociated position; while the automatic associating relation between the cover mechanism and the operating portion of the device is shown in dotted lines.

Figure 5 is a detail perspective view of the operating or lever portion of the device.

Figure 6 is a detail perspective view of the cover carrying mechanism of the device.

My invention contemplates means whereby the movement of a refrigerator car hatch cover and its associated plug will be forced to complete closed position when the device is moved toward sealing position and whereby the cover and plug will be moved upwardly out of the hatch when the device is moved toward releasing position thereby obviating the usual practice of battering or prying the cover plug in order to release it from its more or less wedged position in the hatch.

In the particular exemplification of the invention, a hatch of a refrigerator car is shown, with the hatch timbers 10 extending slightly above the car-roof and provided with the usual tapered inner surfaces as shown so as to effect an air tight sealing relation with the tapered sides of the closure plug 11 which is firmly secured to the lower side of the cover 12. The cover 12 is usually hingedly connected at one side to the car roof by suitable hinges as at 13 so as to allow the cover with its plug to swing upwardly away from the hatch as shown in Figure 4.

The cover 12 may be provided at its hinged side with a supporting strap or bracket as at 14 whereby the cover will be held in its complete open position as shown in Figure 4.

Secured on top of the cover 12 at the side opposite to that on which the hinges are located and preferably at the transverse median line is a rack forming bracket 15 which consists of a horizontally disposed plate portion 16 of any suitable shape and apertured to permit the bracket to be riveted or otherwise firmly secured to the cover 12.

Extending upwardly are a pair of lobes or ears 17 arranged parallel with each other and in spaced relation and these lobes at the forward end of the plate of the bracket terminate in vertically disposed toothed or rack-forming portions 18, 18, see Figure 6.

When the bracket 15 is secured to the cover 12, the rack portions 18, 18 are arranged to lap the forward edge of the cover and depend slightly therebeneath and slightly forward of the casing about the hatch opening as shown in Figure 2.

The upwardly sloping lobes 17 are apertured to receive the U-shape pin 19 whose one side or leg is slightly longer than the other as can be seen in Figure 1, and this long leg at the end is provided with a radially or laterally disposed lip 20 which acts as a stop when the U-pin is in normal position. In order to enable insertion of the U-pin, one of the apertures in the lobes 17 is enlarged in the nature of a slot for the passage of the end of the pin with the lip 20. That is to say, the openings 21 at the base of each lobe 17 are elongated or slotted; the one in the approaching side of the bracket having the slot extend in a downward direction while the slot in the opposite side extends upwardly. The long end of the U-pin with the lip 20 is inserted before the bracket is fastened to the cover, at which time the pin may be swung entirely around so as to dispose the lip 20 in a downward direction where it will register with the downwardly disposed slot; the pin then swung around and the short end inserted in the aperture 21ᵃ adjacent the upper end of the lobe and the bracket then riveted or otherwise secured in place.

It is apparent that after the bracket is secured in place it is impossible to swing the U-pin through a sufficient arc where the lip 20 would register with the slot portion of the aperture and hence complete withdrawal of the long leg of the U-pin is impossible. On the other hand, withdrawal of the pin until the lip 20 strikes the lobe through which it was initially inserted permits the short leg of the pin to clear the other lobe and also the space between the two lobes so as to leave this space free for the reception of the operating lever 22.

The operating lever 22 is of predetermined length and is preferably formed with a plurality of suitably spaced bosses 23 on what may be termed its lower side; and for the purpose of strength these bosses are shown connected by small ribs as at 24 of less width than that of the bosses. These bosses 23 are apertured at 25 and the bosses are adapted to fit between the lobes 17 of bracket member 15, with the opening 25 of a boss 23 registering with the apertures 21ᵃ adjacent the tops of lobes 17 and hence to receive the short leg or side of the U-pin 19.

One end of lever 22 is provided with a toothed portion or segmental gear 26 which also constitutes the pivotal point of the lever. The teeth of the segmental gear 26 are adapted to mesh with the teeth of the rack portions 18, as the gear is of sufficient width to mesh with both portions of the rack 18. The rear end tooth 27 of the segmental gear 26 is made arcuate to curve away from the other teeth, namely toward the rear end of the lever and to extend somewhat beyond the plane of the pivotal point 28 of the lever.

The roof of the car adjacent the hatch frame is provided with a suitable bifurcated bracket 29 to receive the gear-end of the lever therein and to pivotally secure the lever in place by the pivot pin 28, thus permitting the lever to swing through the arc of a vertically disposed circle.

As is apparent from the construction, when the hatch cover is in closed position the teeth of rack 18 will mesh with the teeth of the segmental gear of the lever 22, as shown in Figure 2, while the arcuate tooth 27 will be disposed beneath the pivot point of the lever between the bifurcations of bracket 29 and hence an operative relation between the hatch closure and the lever is maintained as long as the hatch closure is in closed position as shown in Figure 2. With this arrangement movement of lever 22 downwardly across the top of the hatch closure or cover 12 will force the plug 11 and the cover into snug air-tight relation with the hatch timbers 10 and usual surrounding frame through the action of the segmental gear on the rack 18 of the bracket secured to the cover. Such downward movement of the lever will move the boss at the pivoted end of the lever between the lobes 17 of bracket 15 and position the aperture of the boss in register with those in the upper ends of the lobes and permit the short leg of the U-pin to pass through the registering holes and thus enable the closure to be sealed in closed position by use of the usual car sealing medium which may be inserted through suitable transverse slots in both legs of the U-pin and which will prevent a withdrawal movement of the U-pin from the locking position shown in Figure 1.

The ribs 24, between the bosses 23 of lever 22, especially the rib between the boss at the gear end and the next adjacent boss, are made of less width as heretofore stated to permit the ribs to extend across the long leg of the U-pin when the lever is disposed across the top of the cover and to permit the aperture of the lever-boss to come into register with the apertures in the upper ends of the lobes 17 of the rack-bracket on the cover.

When it is desired to open the hatch, the seal is broken and the U-pin moved transversely of the lever to a position where its short leg will be withdrawn from the hole in the boss of the lever. The lever 22 is then swung upwardly and lifts the cover and plug through the action of the segmental gear on the rack-bracket secured to the cover and thus obviates the necessity of prying the cover-plug loose by means of a bar as heretofore has been necessary, and which has frequently resulted in damage to the cover and plug; the lever providing the necessary leverage or power for easily and positively raising the cover and plug.

If a complete opening of the hatch is to be had as shown in full lines in Figure 4, after the lever has been swung sufficiently to clear the cover, the latter is then swung toward the hinged side and allowed to rest on the supporting bracket 14, while the lever 22 is swung in the opposite direction and allowed to drop on the car roof as shown in Figure 4.

When the lever is in this complete inoperative position, the arcuate or curved tooth 27 at the base of the segmental gear will be disposed above and toward one side of the pivotal point of the lever so as to extend into the path traversed by the rack 18 which protrudes beyond the end of the cover as shown in dotted lines in Figure 4. As a result, it is impossible to drop the cover to closed position without automatically inducing a meshing relation between the rack 18 and the segmental gear or pinion 26, because the lower ends of the rack portions 18 will engage the upwardly presented curved surface of the arcuate tooth 27 and forces the lower teeth of portions 18 to ride along the arcuate surface of tooth 27 and into the socket between the arcuate tooth 27 and the adjacent tooth of the segmental gear or pinion 26 and consequently automatically bringing the teeth of the rack and of the segmental gear into mesh with each other.

It is also apparent from the dotted line showing in Figure 4, that the hatch closure cannot drop into closed position without manipulation of the lever as the arcuate tooth 27 will hold the cover as shown in dotted lines in Figure 4.

By providing the lever with a plurality of spaced and apertured bosses 23, the cover may be held in various ventilating positions, as for example shown in Figure 3; the cover being raised to the desired degree and one of the bosses of the lever brought to register with the upper openings in bracket 15 and the short leg of the U-pin passed through the registering holes.

With the arrangement shown and described, the cover-bracket 15 and the sealing or U-pin constitute a unit which prevents loss or displacement of the sealing pin and permits the pin to be used for locking the cover in any adjusted position. Then, too, with my improved structure it is apparent that accidental dropping of the closure into complete closing position, where the plug would wedge itself in the beveled opening, is impossible.

The exemplification of the invention is believed to be its best embodiment and I have described it in terms used for purposes of description and not as terms of limitation, as structural modifications may be possible without, however, departing from the spirit of my invention as expressed in the appended claims.

What I claim is:

1. A hatch cover controlling device comprising, in combination with a hatch cover hingedly secured at one end, a bracket secured on top and at the opposite end of the cover and provided with a rack portion disposed vertically beyond the end and beneath the top of the cover; and a lever pivotally secured adjacent to the free end of the hatch cover so as to swing vertically onto the hatch cover when the latter is in closed position, the pivoted end of the lever having a segmental gear adapted to mesh with the rack portion of said cover-bracket and provided with a rearwardly curved stop and guide projection adapted to extend into the path of and beneath said rack portion when the lever is moved into complete open position and thereby support the cover in unseated position.

2. A hatch cover controlling device comprising, in combination with a hatch cover hingedly secured at one end to swing vertically, a bracket fixedly secured to the free end of the cover, the bracket having a pair of spaced apart lobes terminating in vertically disposed rack forming portions adapted to extend beneath the top of the cover, a lever pivotally secured adjacent the free end of the hatch cover so as to swing vertically and transversely of the cover when in closed position, said lever being adapted to pass between the spaced lobes of the bracket, and pinion forming means secured to the pivoted end of said lever and normally meshing with both rack forming portions of the bracket, said pinion also having an extended and rearwardly curved tooth adapted to extend beneath the rack portions and to hold the cover in partially raised, unseated position.

3. A hatch cover controlling device comprising, in combination with a hatch cover hingedly secured at one end to swing vertically, a locking-pin carrying bracket secured to the opposite free end of the cover and provided with a vertically disposed rack forming portion disposed beyond the end of the cover and extending vertically beneath the top of the cover, a lever pivotally secured at one end so as to swing vertically and transversely of the cover when in closed position, and a segmental pinion arranged at the pivoted end of the lever so as to mesh with said rack portion of the bracket when the cover is in closed position and to rotate when the lever is oscillated, with one tooth of the segmental pinion being curved rearwardly and adapted to extend into the path of said rack portion when the cover has been lifted and the lever swung to complete open position, said curved tooth engaging beneath the rack forming portion to support the hatch cover in unseated position.

4. A hatch cover controlling device comprising, in combination with a hatch cover hingedly secured at one end to swing vertically, a vertically disposed rack secured at the free end of the cover so as to extend beyond the cover, a lever pivotally secured adjacent the free end of the cover so as to swing vertically across the cover when the latter is closed, a segmental pinion secured at the pivoted end of the lever and movable with the lever, said segmental pinion meshing with the rack when the cover is in closed position so as to force the latter upwardly when the lever is swung upwardly away from the cover, and an arcuate member secured to said pinion and normally disposed beneath the pivotal point of the lever when the pinion is in mesh with the rack and to move into a plane above the pivotal point and in the path of said rack when the pinion has been moved out of mesh with the rack and to support the cover in unseated position.

VICTOR H. HARBERT.